E. J. KEARNEY & T. TRECKER.
ARBOR HOLDING ATTACHMENT.
APPLICATION FILED APR. 7, 1911.
1,053,295.
Patented Feb. 18, 1913.
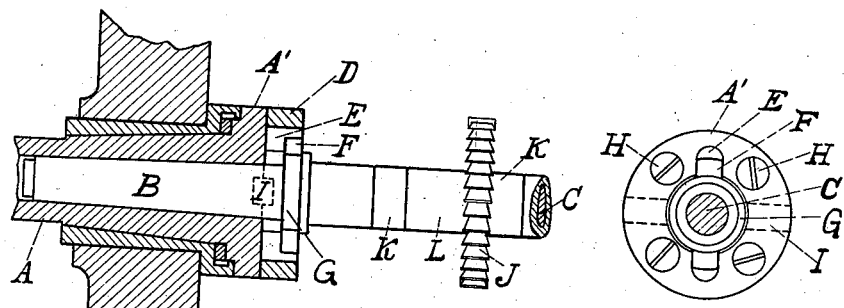
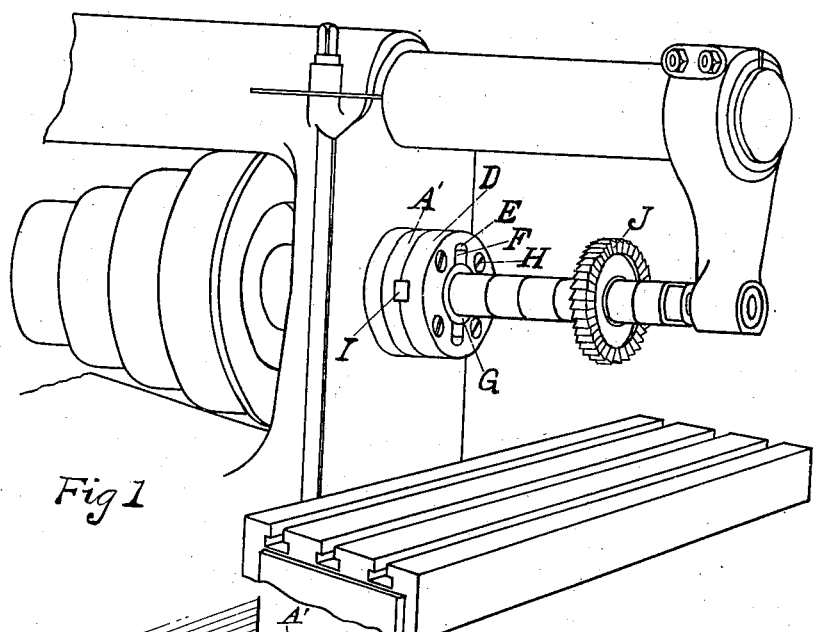
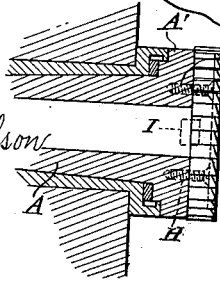

UNITED STATES PATENT OFFICE.

EDWARD J. KEARNEY, OF WAUWATOSA, AND THEODORE TRECKER, OF WEST ALLIS, WISCONSIN.

ARBOR-HOLDING ATTACHMENT.

1,053,295.  Specification of Letters Patent.  Patented Feb. 18, 1913.

Application filed April 7, 1911. Serial No. 619,477.

*To all whom it may concern:*

Be it known that we, EDWARD J. KEARNEY and THEODORE TRECKER, citizens of the United States, residing, respectively, at Wauwatosa and West Allis, county of Milwaukee, and State of Wisconsin, have invented new and useful Improvements in Arbor-Holding Attachments, of which the following is a specification.
Our invention relates to improvements in arbor holding attachments for milling machine spindles.

The usual practice is to employ a spindle which has an arbor receiving socket and is provided with slots or notches to receive projections carried by the arbor, the spindle being threaded externally to receive face milling cutters. But the screw threads and also notched portions of the spindle are frequently damaged and necessitate replacement of the tool or arbor, and in some instances, of the spindle also. In such machines, when a face cutter is turned in one direction, the threads are caused to bind, and when turned in the other direction, the tendency is for the tool to unscrew, and detach itself from the spindle, making it impractical to use both right and left hand cutters, as is frequently desirable in the use of face cutters.

The object of our invention is to provide a spindle adapted to receive a removable attachment for engaging an arbor, and through which rotative motion may be transmitted in either direction to the arbor and tool, the attachment being connected with the spindle in such a manner as to substantially eliminate the possibility of injury to the spindle;—also to provide a form of spindle adapted for driving face cutters in either direction of rotation.

In the following description, reference is had to the accompanying drawings, in which—
Figure 1 is a perspective view illustrating a portion of a milling machine, including the spindle and arbor, and showing my invention embodied therein. Fig. 2 is a detail view, showing, in section, the arbor receiving end of the spindle, together with the bearing member and a portion of the column, and also showing the arbor in position and supporting a milling cutter. Fig. 3 is a detail view of the outer face of the connecting member, with the arbor in position, the arbor being shown in cross section. Fig. 4 is a detail sectional view of the arbor receiving end of the spindle with the connecting member removed and a face milling cutter thereon in position for use.

Like parts are identified by the same reference characters throughout the several views.

The spindle A is provided with the usual socket to receive the tapered plug B of the arbor C. It is also provided with an end flange A' at the arbor receiving end of the spindle, which is faced off to receive a connecting member D, which comprises an arbor engaging collar having interior notches E in which projections F carried by an arbor flange G are adapted to enter. The connecting member D is secured to the end of the spindle by screws H, which are relieved of strain by key members I, socketed in the opposing faces of the spindle and connecting member. When the arbor plug B is inserted in the spindle socket, the projections F enter the collar notches E and the motion of the spindle is transmitted through the connecting member and projections F to the arbor and the tool or cutter J.

It is not essential that the flange G and projections F should be formed integrally with the arbor bar, since the arbor may be provided with sleeve members, such as the spacing members K and L, which in ordinary practice have key connection with the arbor bar, and one of which, for the purposes of our invention, may be provided with suitable lugs or projections F. But where the arbors are manufactured especially for use with the connecting member D, the projections F and flange G may be formed integrally with the arbor or with the tool or cutter. Where face milling cutters are used, the connecting member D may be removed, and the cutter secured directly to the head, by the screws H. In such case, the cutter will of course be provided with notches to receive the keys I.

Having thus described our invention, what we claim as new, and desire to secure by Letters Patent, is—

1. The combination with the spindle of a milling machine having a socketed end, of a separable connecting member rigidly secured to said spindle end, and apertured to allow an arbor plug to pass therethrough,— said connecting member having internal notches extending radially from the walls of said aperture,—and an arbor having a plug adapted to enter the spindle socket, and provided with projections adapted to seat in said notches.

2. The combination with the arbor receiving end of a milling machine spindle, of a separable connecting member seated upon the end of the spindle, screws rigidly securing said member to the ends of the spindle, and an arbor adapted for interlocking engagement with said member to receive rotary motion therefrom; said spindle end being adapted for the rigid connection therewith of either the connecting member or a face milling cutter, interchangeably, by means of such screws.

3. The combination with the arbor receiving end of a milling machine spindle, of a separable connecting collar member seated upon the end of the spindle and keyed thereto, screws securing said member to the spindle, and an arbor extending through the collar member into the spindle, and having projections interlocking with said member to receive rotary motion therefrom.

4. The combination with a socketed end portion of a milling machine spindle of a separable connecting collar member rigidly seated upon the end of the spindle and provided with internal notches, and an arbor having a tapered plug socketed in the spindle, and also having a flange adapted to enter the collar and provided with projections fitting said notches; said collar being interlocked with the spindle and adapted to transmit rotative motion therefrom to the arbor, substantially as described.

5. The combination of a milling machine spindle, having a flat faced, flanged and socketed, arbor receiving end, an annular connecting member seated on said flat faced flanged end, and provided with internal notches, and an arbor member having projections adapted to enter the notches and the spindle socket respectively.

In testimony whereof we affix our signatures in the presence of two witnesses.

EDWARD J. KEARNEY.
THEODORE TRECKER.

Witnesses:
G. A. WEBER,
WALTER MICKELSON.